Patented July 10, 1923.

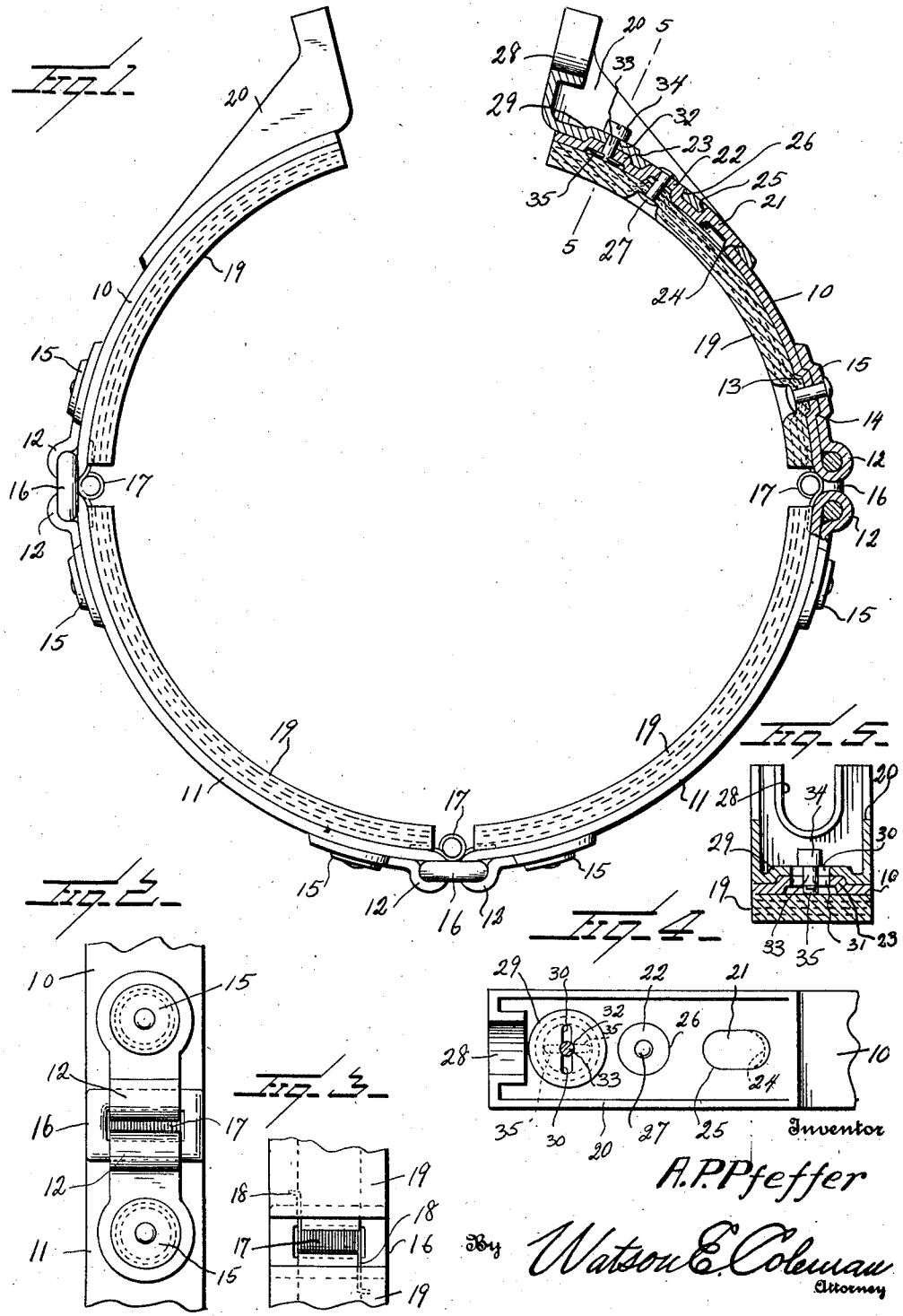

1,461,286

UNITED STATES PATENT OFFICE.

ANTHONY P. PFEFFER, OF DETROIT, MICHIGAN.

TRANSMISSION BAND.

Application filed June 10, 1922. Serial No. 567,237.

*To all whom it may concern:*

Be it known that I, ANTHONY P. PFEFFER, a citizen of the United States, residing at Detroit, in the county of Wayne and State of Michigan, have invented certain new and useful Improvements in Transmission Bands, of which the following is a specification, reference being had to the accompanying drawings.

This invention relates to improvements in transmission bands, and more particularly to an improvement in that form of transmission band employed for controlling the operation of planetary gearing of the type at present employed in transmissions of the type shown in the patent to H. Ford, No. 1,005,186, granted October 10, 1911.

An important object of the invention is to provide means whereby tensioning ears of the bands may be readily applied to and removed therefrom.

A further object of the invention is to provide a band so constructed that all danger of binding of the same upon the drum with which it coacts is eliminated.

A still further object of the invention is to provide a device of this character in which the necessity of employing spring metal in its construction is eliminated, thereby eliminating the danger of these bands breaking and the parts thereof becoming jammed in the intermeshing gears to break the same.

An additional object of the invention is to provide a device of this character which is simple in construction and operation, durable in service, and a general improvement in the art.

These and other objects I attain by the construction and arrangement shown in the accompanying drawings wherein for the purpose of illustration is shown a preferred embodiment of my invention and wherein like reference characters designate like parts throughout.

In the drawings:

Figure 1 is a side elevation partly in section of a transmission band constructed in accordance with my invention;

Figure 2 is a detailed view showing the manner of connecting the sections thereof;

Figure 3 is a view showing the spring mounting;

Figure 4 is a plan view of the compression spring; and

Figure 5 is a section on the line 5—5 of Figure 1.

Referring now more particularly to the drawings, the band comprises end sections 10 of which two are provided and intermediate sections 11. The ends of the intermediate sections 11 and of the end sections 10 which join with the intermediate sections are bent back upon themselves to form shackle loops 12. Adjacent such end portions the metal of the body of the sections is struck out to form at the inner face of the band a socket 13 and at the outer face a shoulder 14. The end metal of the reverted portion is shaped about this struck out portion, as indicated at 15.

The numeral 16 indicates a shackle link having its side portions engaged in the shackle loops 12 and bearing a coil spring 17, the ends 18 of which are engaged with the adjacent inner faces of the band sections 11, or 10 and 11 as the case may be, tending to throw these sections into line with one another and straighten the bands. Employment of this connection between the adjacent ends of the sections 11 and the sections 10 and 11 eliminates the necessity of forming the band of spring metal and permits the use of some soft and tough substance such as malleable iron or soft steel which is much more durable and less liable to shatter in use than the ordinary steel or cast iron band. In securing the lining 19 to the inner face of the band the rivets thereof are passed through openings formed in the shoulder 14 and the overlying portion of the reverted end of the band so as to hold these sections firmly together and prevent movement thereof.

The sections 10 have those end portions thereof to which the adjusting ears 20 are secured provided with off set portions 21, 22 and 23. The offset portion 21, or that offset portion furthest from the free end of the section 10, is provided with an undercut face 24 at that side thereof remote from the free end of the section 10 adapted to receive an angular shoulder formed at the side face of an opening 25 formed in the adjusting ear 20 for the reception of the offset portion 21. The adjusting ear 20 is provided with a second opening 26 through which the offset 22 may extend to render the offset accessible so that rivets 27 may be disposed therethrough for securing into position this end of the lining 19. The adjusting ears are provided adjacent that portion thereof bearing the ear proper 28 with an offset portion forming a socket 29 receiving the offset 23 of the section 10. Aligned openings are formed in the adjusting ear and offset 23, as indicated by the numerals 30 and 31 in Figure 5 each having a central enlargement 32 in which a shank 33 of a securing member is rotatable. This securing member is provided with a head 34 preferably having a screw driver slot so that it may be readily rotated, and upon the lower end of the stem thereof with flat oppositely extending arms 35 which are insertible through the openings 30 and 31 when properly aligned therewith. By rotating the securing member these arms may be disposed at right angles to the openings 30 and 31 to prevent separation of the ear and the section 10 to which it is attached. Attention is directed to the fact that the offsetting of the metal of the band provides a socket within which the arms may be rotated and to the fact that the undercut face of the offset portion 21 of the band 10 receiving the angular shoulder 24 renders it necessary that the end of the attaching ear be first elevated to free the attaching ear from the offset portions 21, 22 and 23 of the section 10 to which it is attached and then to shift the same longitudinally to free the shoulder from the inclined face.

It will accordingly be seen that by constructing a transmission band in accordance with my invention the ears thereof may be readily attached and removed and the band will automatically free itself from the drum when the tension upon the ears is released to permit movement thereof, each spring 17 operating independently to shift its sections. It will furthermore be obvious that the construction as hereinbefore set forth is capable of some change and modification without materially departing from the spirit of my invention and I accordingly do not limit myself thereto except as hereinafter claimed.

I claim:—

1. A transmission band comprising a plurality of sections pivotally connected at their adjacent ends, and spring means disposed at each connection and tending to move said sections into line one with the other.

2. A transmission band comprising end sections and intermediate sections, adjacent ends of the intermediate sections coacting with adjacent ends of the end sections having the end portions thereof bent to provide link receiving loops, links disposed through said loops and connecting said sections, spring means for moving the sections to open position, and adjusting ears carried by the free ends of the end sections.

3. A transmission band comprising pivotally connected sections each provided upon its inner face with a strip of lining, and means tending to move said sections into alignment one with the other.

4. A transmission band comprising intermediate and end sections, adjacent ends of the intermediate sections and the ends thereof coacting with the adjacent ends of the end sections having the end portions thereof bent back to provide pivot receiving loops, said sections being provided adjacent such loops with offsets forming shoulders, and sockets formed upon the end portions receiving said shoulders.

5. A transmission band comprising intermediate and end sections, adjacent ends of the intermediate sections and the ends thereof coacting with the adjacent ends of the end sections having the end portions thereof bent back to provide pivot receiving loops, said sections being provided with offset portions forming upon the inner face of the band a socket and upon the outer face of the band a shoulder, said end sections having sockets receiving said shoulders and securing elements extending through the end sections and the offset portions of the corresponding sections for securing a lining to the inner face of the sections.

6. A transmission band provided adjacent the ends thereof with shoulders having the faces thereof remote from the ends of the band undercut and provided intermediate such shoulders and the ends of the band with offset portions forming upon the inner face of the band a socket and upon the outer face of the band a shoulder, adjusting ears having openings receiving the first named shoulders and provided with shoulders coacting with the undercut faces of the first named shoulders, a socket receiving the second named shoulder, and means extending through the adjusting ears and the offset portion forming the last named shoulder and engaging in the socket formed by such offset portions preventing vertical movement of the adjusting ears.

In testimony whereof I hereunto affix my signature.

ANTHONY P. PFEFFER.